US008656826B2

(12) United States Patent
Bianchi et al.

(10) Patent No.: US 8,656,826 B2
(45) Date of Patent: Feb. 25, 2014

(54) ESPRESSO COFFEE MACHINE

(75) Inventors: Roberto Bianchi, Bergamo (IT); Jacob Ellul-Blake, Seattle, WA (US)

(73) Assignee: La Marzocco, SRL, Florence (IT)

( * ) Notice: Subject to any disclaimer, the term of this patent is extended or adjusted under 35 U.S.C. 154(b) by 156 days.

(21) Appl. No.: 12/760,555

(22) Filed: Apr. 15, 2010

(65) Prior Publication Data

US 2011/0094390 A1 Apr. 28, 2011

Related U.S. Application Data

(63) Continuation-in-part of application No. 12/756,170, filed on Apr. 7, 2010.

(30) Foreign Application Priority Data

Oct. 23, 2009 (IT) .............................. PO2009U0011

(51) Int. Cl.
*A47J 31/047* (2006.01)
(52) U.S. Cl.
USPC .............................................. 99/281; 99/279

(58) Field of Classification Search
USPC ........... 99/281, 288, 285, 286, 290, 279, 280, 99/282, 283, 289 R, 291, 293, 297, 299, 99/302 R, 302 P, 275; 222/146.1, 145, 222/146.6, 640, 129.1, 129.2, 129.3, 129.4
See application file for complete search history.

(56) References Cited

U.S. PATENT DOCUMENTS

| 4,858,522 | A | * | 8/1989 | Castelli .......................... 99/280 |
| 5,207,148 | A | * | 5/1993 | Anderson et al. ............... 99/281 |
| 2003/0070555 | A1 | * | 4/2003 | Reyhanloo ...................... 99/282 |
| 2007/0277676 | A1 | * | 12/2007 | Crivellin ......................... 99/288 |
| 2008/0041231 | A1 | * | 2/2008 | Beharry et al. .................. 99/279 |
| 2008/0190297 | A1 | | 8/2008 | Gussmann et al. |

* cited by examiner

*Primary Examiner* — Henry Yuen
*Assistant Examiner* — Phuong Nguyen
(74) *Attorney, Agent, or Firm* — Hart IP Law & Strategies; James A. Sheridan

(57) ABSTRACT

Systems and methods for an improved espresso coffee machine are described. In one aspect, the improved espresso coffee machine includes one or more operating units, each of which at least includes a boiler, a pump, a heating unit, and a unit for aroma extraction and dispensing of the espresso coffee brew, including related conduits. Each unit is equipped with a system for controlling and adjusting the espresso coffee brewing parameters.

12 Claims, 4 Drawing Sheets

ESPRESSO COFFEE MACHINE

RELATED APPLICATIONS

This patent application is a continuation in part of U.S. patent application Ser. No. 12/756,170, filed on Apr. 7, 2010, titled "Improved Espresso Coffee Machine," and which is herein incorporated by reference. U.S. patent application Ser. No. 12/756,170 claims priority to Italian utility model patent Application Serial No. PO2009U000011, which was filed on Oct. 24, 2009.

TECHNICAL FIELD

The systems and methods of this invention disclosure relate to an improved espresso coffee machine at corresponding methodologies.

BACKGROUND

As is known, brewing espresso coffee requires that a certain amount of water (usually around 60 ml) at 90° C. be forced through a coffee pod weighing around 14 g at a nominal pressure of 9 bar. It is also known that the quality of the espresso is greatly influenced by pressure and temperature. The physical properties of coffee vary depending on the variety. It follows, therefore, that the parameters for an optimal brew differ for each coffee variety.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

Systems and methods for an espresso coffee machine are described. In one aspect, the improved espresso coffee machine comprises one or more operating units, each of which at least comprises a boiler, a pump, a heating unit, and a unit for aroma extraction and dispensing of the espresso coffee brew, including related conduits. Each unit is equipped with a system for controlling and adjusting the espresso coffee brewing parameters.

BRIEF DESCRIPTION OF THE DRAWINGS

Experts in the trade will better appreciate the technical advantages of the following described systems and methods for an improved espresso coffee machine from the following description with reference to the accompanying drawings, which illustrate a preferred non-limiting embodiment of it and in which.

DETAILED DESCRIPTION

Overview

Prior art machines are ordinarily equipped with a pump driven by an electrical, alternating current motor. Typically, although the pump is equipped with means for setting the water outlet pressure upon installation, the pressure subsequently cannot be adjusted at the user's will.

Moreover, the temperature usually is controlled by a heat exchanger, an electromechanical thermostat, or an electronic PID temperature controller. At best, these systems provide consistent temperature stability but cannot implement repeatable and customizable temperature profiles.

In contrast to conventional state-of-the-art espresso coffee machines, the following described systems and methods for improved espresso coffee machines provide, for example, an espresso coffee machine where the brewing parameters can be controlled and adjusted by the user. These novel systems and methodologies are now described in greater detail.

Exemplary Systems and Methods for an Improved Espresso Coffee Machine

Figure 1:
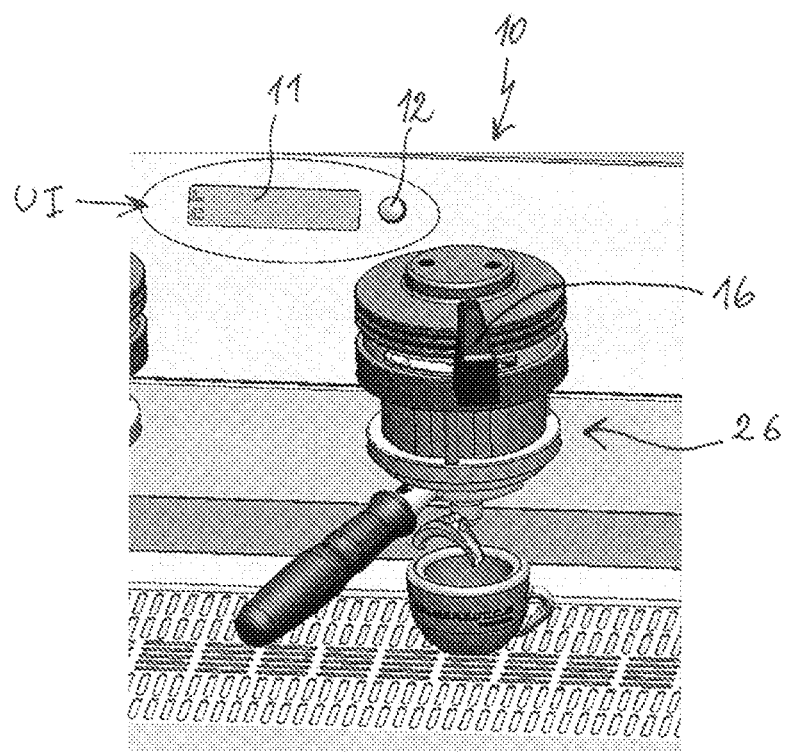
FIG. 1 is an exemplary front view of an espresso coffee machine, according to one embodiment.

FIG. 1 shows an exemplary front view of an espresso coffee machine, according to one embodiment. With reference to FIG. 1, an espresso coffee machine includes one or more operating units 10, each of which comprises a boiler 14 and a pump 13 (see FIG. 3) connected by related conduits to a group 26 for aroma extraction and dispensing of the espresso coffee brew. Each unit 10 is also provided with a user interface (III) comprising a display 11 at least one command button 12, and a manual actuator 16 of the pump. To facilitate ergonomics, the manual actuator 16 is located on the brewing group 26.

Figure 2:
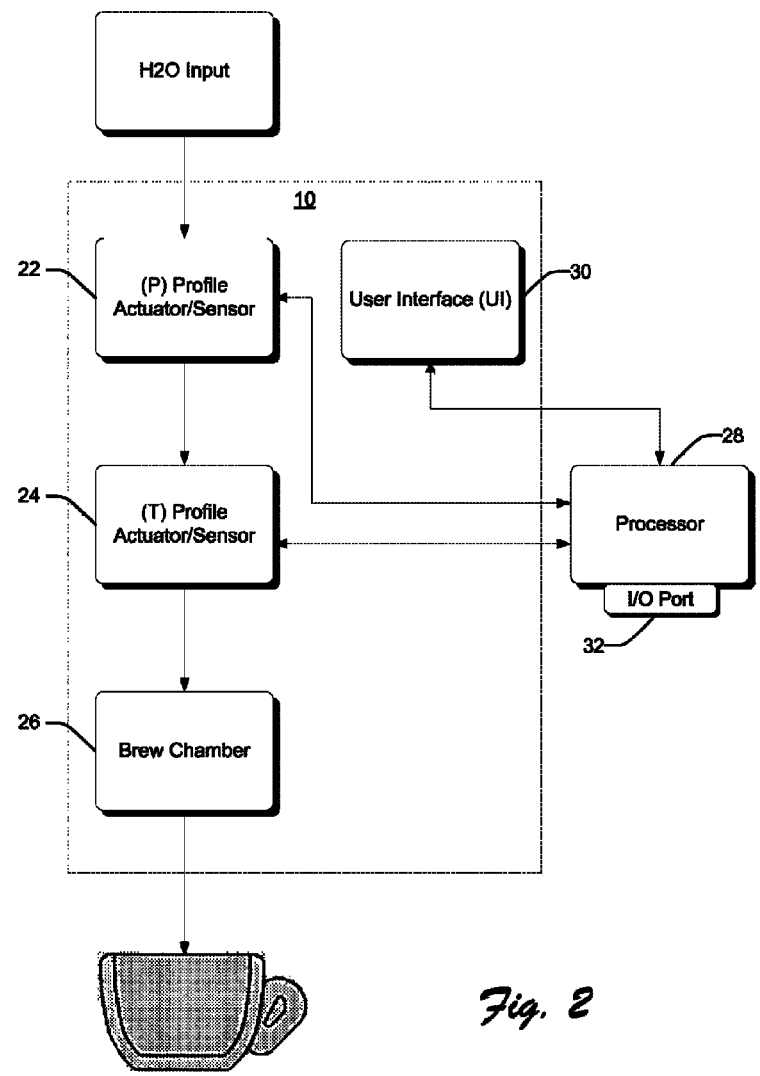
FIG. 2 illustrates an exemplary schematic working diagram of one of the espresso coffee operating units, according to one embodiment.

FIG. 2 illustrates an exemplary schematic working diagram of one of the espresso coffee dispensing systems/units, according to one embodiment. As illustrated in FIG. 2, each unit 10 is equipped with a system for controlling and adjusting the espresso coffee brewing parameters. For instance, there is shown a brew chamber, which is a unit 26 for aroma extraction and dispensing of the espresso coffee brew, including related conduits. The system comprises a processor or central processing unit (CPU) 28 operatively connected to: (a) a pressure control module 22; (b) a temperature control module 24, in one exemplary embodiment; and (c) to a user interface (UI) 30. In one implementation, the CPU also has an I/O port 32 for connection to a personal computer.

Through the user interface, a user can adjust the extraction pressure and/or the temperature in real time, substantially allowing the user to optimize these characteristics according to each different coffee blend used.

Figure 3:
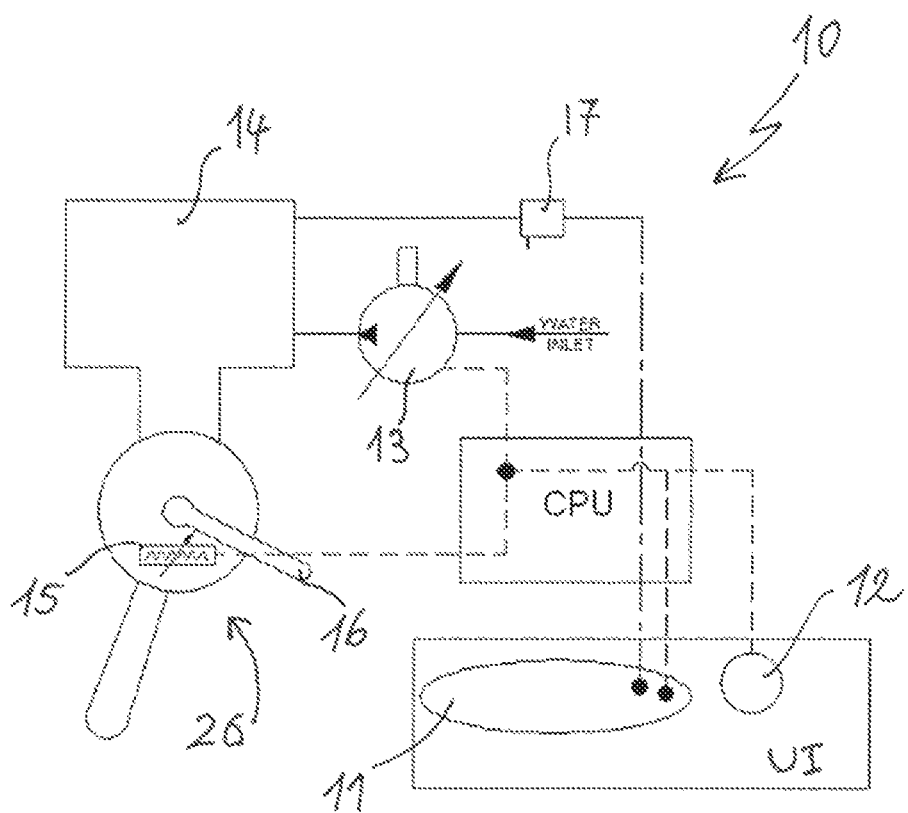
FIG. 3 shows a schematic representation of the components of exemplary embodiment of the operating unit of FIG. 2.

FIG. 3 shows an exemplary embodiment o f an operating unit 10, according to one implementation. Operating unit 10 includes, for example, a variable speed DC motor pump 13, a rheostat 15 manually operated by means o f the lever (actuator) 16, and pressure transducer 17. The control unit/processor includes, for example, a memory is configured to operatively couple to an external memory device (e.g. via a USB port).

In a first operating mode, the pressure is manually adjusted acting with the lever 16 on the rheostat 15 which changes, through the control processing unit, the speed of the pump 13. In this operating mode the user can change the pressure as desired for brewing of the espresso.

In a second operating mode, different pressure profiles are stored in a memory operatively coupled to the processor) or CPU) and accessed (e.g., via the UI) by the user. For example, in one embodiment a desired pressure profile is selected by the user through the command button 12. Responsive to this selection, the pump 13 is activated, acting on the rheostat 15 through the lever 16. The processor drives the output of the associated control module (i.e. adjusts the speed of the pump 13) to reproduce the programmed pressure curve.

The different profiles of pressure can be stored in the memory operatively coupled to the processor by recording the profiles obtained in the manually operated mode. In another implementation, predefined profiles are downloaded from an external memory device (e.g., via a USB port, through wireless means, and/or so on). In one implementation, the system 10 allows a user to transfer a recorded profile from the memory to an external computing device (e.g., a general purpose computer, mobile computing device, and/or so on), to edit the profile (e.g., vary its shape, etc.), and upload (or download) the new profile into memory of the improved coffee espresso machine.

Three exemplary and different pressure profiles obtainable according to the invention are shown in FIG. 3.

In a further exemplary embodiment of the described improved coffee espresso machine, a user can also control the extraction temperature in real time. The temperature profile can therefore be optimized for a particular coffee variety and easily selected through the user interface. In this scenario, the processor is operatively configured to store into memory different temperature profiles to be sent to the associated control module.

Figure 4:
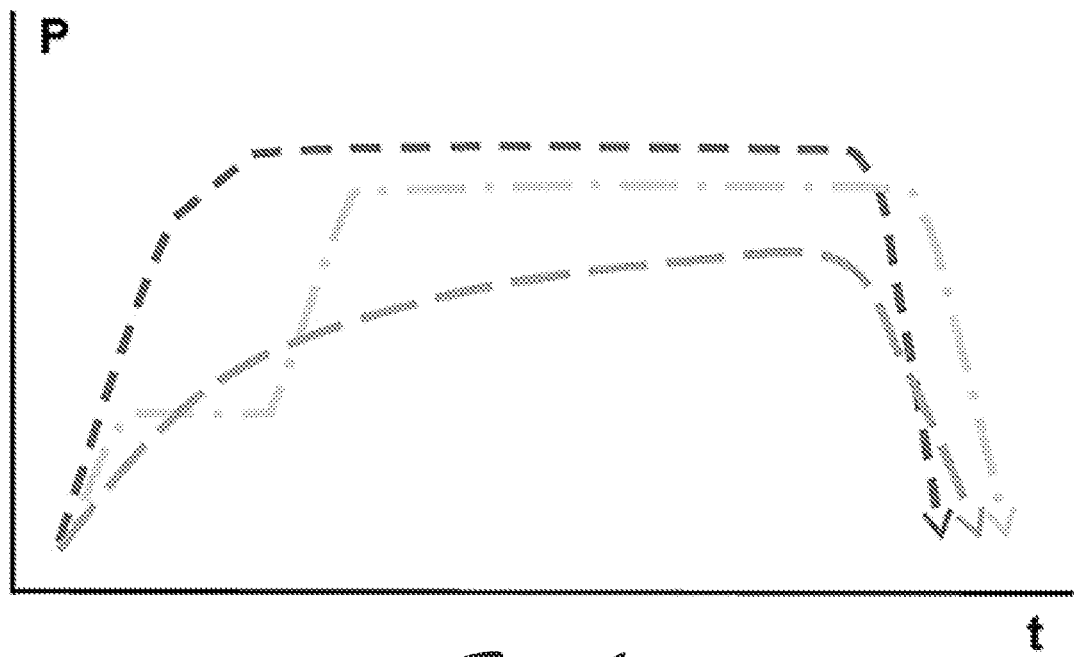
FIG. 4 shows a set of different and exemplary pressure profiles obtainable with an espresso coffee machine as claimed, according to one embodiment.

FIG. 4 shows a set of different and exemplary pressure profiles obtainable with an espresso coffee machine as claimed, according to one embodiment.

Conclusion

Although the above sections describe systems and methods for an improved espresso coffee machine in language specific to structural features, the implementations defined in the appended claims are not necessarily limited to the specific described features. Rather, the specific features are disclosed as exemplary forms of implementing the claimed subject matter.

The invention claimed is:

1. An espresso coffee machine comprising:
   one or more operating units, each operating unit comprising:
   a system for controlling and adjusting espresso coffee brewing parameters;
   a boiler;
   a pump configured to change a speed thereof so as to vary a brewing pressure;
   a processor;
   a rheostat operatively connected to the pump, operatively connected to the processor, the rheostat operatively configured to activate the pump, the rheostat operatively configured to allow a user to manually modulate the espresso coffee brew extraction pressure, and the rheostat operatively configured to change a speed of the pump;
   a heating unit; and
   an aroma extraction and espresso coffee brew dispensing unit;
   wherein pressure is manually adjusted acting on said rheostat which changes, through said processor, the speed of the pump so that a user can change pressure as desired for brewing of espresso;
   wherein said processor is operatively coupled to: a pressure control module; a temperature control module; and a user interface;
   wherein the processor is operatively configured to store pressure profile(s); and
   wherein each operating unit further comprises a pressure gauge.

2. The espresso coffee machine of claim 1, further comprising a pressure control module operatively configured to modulate the espresso coffee brew extraction pressure.

3. The espresso coffee machine of claim 1, further comprising a temperature control module operatively configured to modulate the espresso coffee brew extraction temperature.

4. The espresso coffee machine of claim 1, wherein the processor further comprises a port (I/O) for connection to a personal computer.

5. The espresso coffee machine of claim 1, wherein the processor is operatively configured to access one or more stored pressure profiles responsive to a request by a user for reproduction of corresponding pressure parameters by the pressure control module.

6. The espresso coffee machine of claim 1, wherein the processor is operatively configured to store temperature profile(s).

7. The espresso coffee machine of claim 6, wherein the processor is operatively configured to: (a) access, responsive to a request by a user, one or more stored temperature profiles; and (b) interface with the temperature control module to reproduce characteristics of a user access to temperature profile.

8. The espresso coffee machine of claim 1, further comprising a manual actuator acting on the pressure control module.

9. The espresso coffee machine of claim 1, wherein the rheostat is operatively configured to allow a user to manually modulate the espresso coffee brew extraction pressure.

10. The espresso coffee machine of claim 9, wherein the rheostat is operatively configured to change a speed of the pump.

11. The espresso coffee machine of claim 1, further comprising a lever in operable connection with the rheostat, and wherein the lever and the rheostat are operatively configured to allow a user to manually modulate the espresso coffee brew extraction pressure.

12. The espresso coffee machine of claim 1, further comprising a user interface to select a pressure profile configured to operate the pump after activation by the rheostat.

* * * * *